United States Patent Office 3,536,775
Patented Oct. 27, 1970

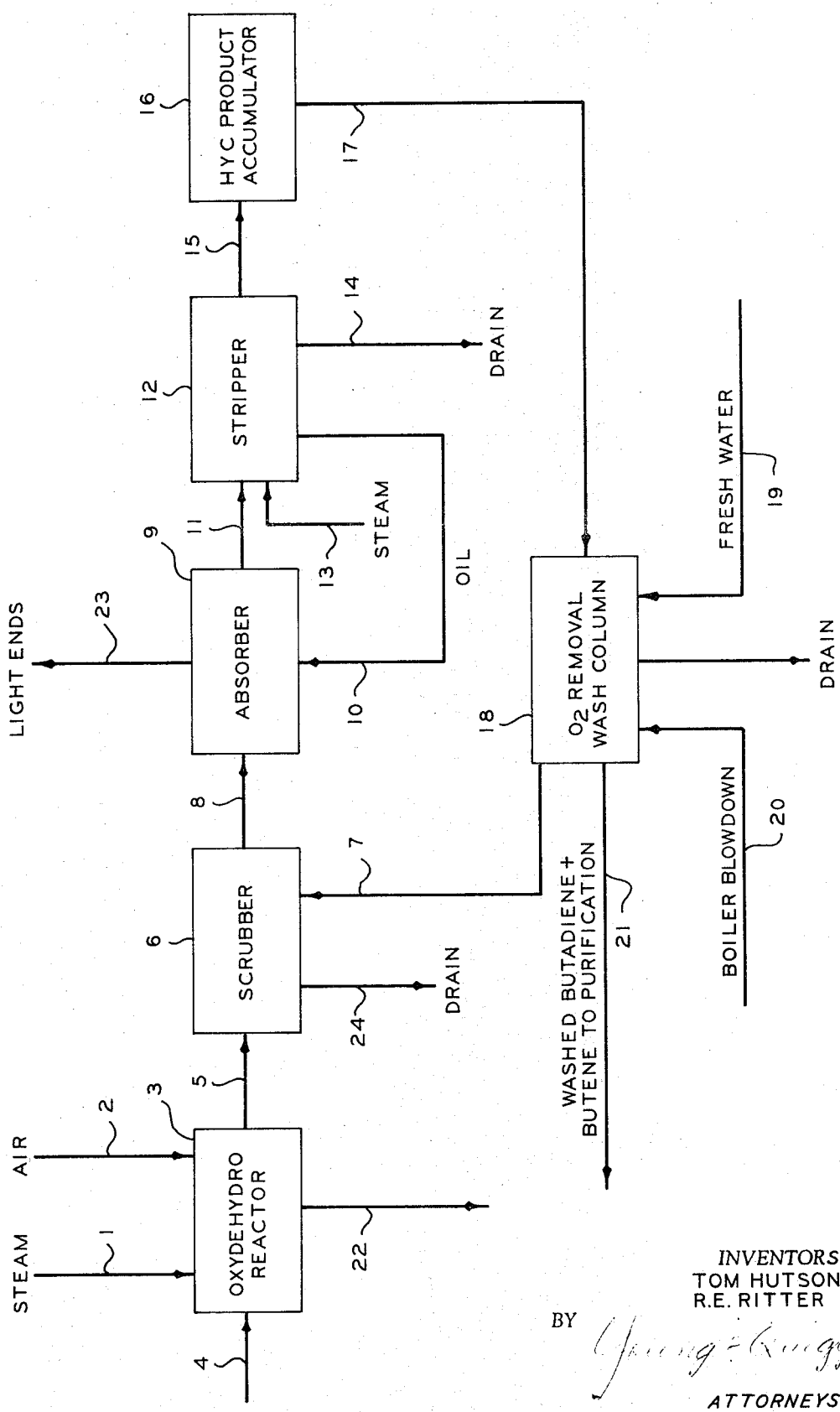

3,536,775
REMOVAL OF OXYGEN AND OXYGENATED COMPOUNDS FROM UNSATURATED HYDROCARBONS
Thomas Hutson, Jr., and Ronald E. Ritter, Bartlesville, Okla., assignors to Phillips Petroleum Company, a corporation of Delaware
Filed June 2, 1969, Ser. No. 829,256
Int. Cl. C07c 7/00, 11/22; B01d 19/00
U.S. Cl. 260—681.5
9 Claims

ABSTRACT OF THE DISCLOSURE

Oxygen and oxygenated materials are removed from unsaturated hydrocarbons, for example, removal of oxygen by a water wash treatment from butadiene-containing products resulting from the oxidative-dehydrogenation of butene. A water scrubbing treatment is described. A packed column is used in one embodiment. Several scrubbing stages are provided in one embodiment. The water used can be a steam condensate such as boiler blowdown. In a combination operation, water is used first to scrub the product butadiene, which is recovered after lean oil absorption, to remove traces of oxygen therefrom along with water-soluble oxygenated materials and then used to scrub the oxidative-dehydrogenation reaction reactor effluent. Pure water or water reasonably low in in oxygen and capable of removing oxygen from the streams treated can be used.

This invention relates to the removal of oxygen and oxygenated materials from unsaturated compounds. More specifically this invention relates to the production of butadiene. More particularly it relates to the purification of butadiene. Still further it relates to purification of butadiene which can be obtained by oxidative-dehydrogenation.

In one of its concepts this invention provides a process for the preparation of unsaturated hydrocarbons, more specifically to obtain them substantially completely purified of oxygen and oxygenated materials or compounds. In another of its concepts the invention provides a method for removal of oxygen and/or oxygenated materials or compounds from a stream containing an alkadiene such as butadiene, obtained as by oxidative-dehydrogenation of olefins, by treating said stream with water. In a more specific concept of the invention it provides such a treatment involving a water scrubbing as in a packed tower. In a further concept of the invention it provides a combination operation in which water is used to scrub oxygen or oxygenated compounds from a butadiene product stream obtained from oil absorption of a washed oxidative-dehydrogenation reactor effluent stream and then the thus used water is used to wash said reactor effluent stream thus effecting savings.

Various solutions have been tried for removing oxygen and oxygenated compounds from unsaturated hydrocarbons, e.g., butadiene containing streams containing the same. Thus, there have been used aqueous solutions of sodium nitrite and aqueous solutions of sodium sulfite. None of these streams has proven really effective in substantially reducing the residual or trace oxygen concentration. Please note: Table I

TABLE I.—LABORATORY TESTS

| | P.p.m. $O_2$ after scrubbing with— | | |
|---|---|---|---|
| | $H_2O$ | 2% $Na_2SO_3$ solution | 10% NaOH solution |
| P.p.m. $O_2$ before scrubbing: | | | |
| 90 | 20 | 60 | 30 |

We have now found that the residual oxygen can be very substantially reduced by water scrubbing of the butadiene-containing stream as evidenced by Table II

TABLE II.—SEMI-COMMERCIAL UNIT PRODUCT SCRUBBER [1]

| | P.p.m. $O_2$ after scrubbing with— | | |
|---|---|---|---|
| | $H_2O$ | 1% $NaNO_2$ solution | 0.008 wt. percent $Na_2SO_3$ solution |
| P.p.m. $O_2$ before scrubbing: | | | |
| 92 | | 88 | |
| 61 | | | 51 |
| 42 | 4 | | |
| 17 | 7 | | |
| 22 | | | 19 |
| 37 | | 36 | |

[1] Liquid-liquid contacting in packed column.

As can be seen from Table II the parts per million of oxygen after scrubbing with water of comparable streams is considerably reduced beyond that obtainable with sodium nitrite or with sodium sulfite solutions heretofore used.

Although the invention is described primarily with respect to the removal of oxygen and oxygenated materials from butadiene-containing streams, more specifically, as these streams result from oxidative-dehydrogenation of hydrocarbons, it will be clear to one skilled in the art having studied this disclosure that the invention is broadly applicable to the removal of oxygen from hydrocarbon streams containing unsaturated compounds or hydrocarbons such as butenes, butadiene-1,3,isoprene, styrene and the like. For sake of simplicity, the invention is now further described with respect to butadiene purification, especially as it results of oxidative-dehydrogenation of butene.

It is an object of this invention to provide an improved process for the production of butadiene. It is another object of this invention to provide an improved process for the purification of butadiene. A still further object of the invention is to provide a process for removal of oxygen and/or oxygenated materials or compounds from a stream containing butadiene. A further object still is to provide a process which will considerably reduce the trace oxygen or oxygen compounds in a butadiene stream obtained from oxidative-dehydrogenation of a hydrocarbon stream containing butene. Broadly stated, an object of this invention is to remove oxygen and/or oxygen materials from unsaturated compounds or hydrocarbons, for example, as produced by oxidative-dehydrogenation.

Other aspects, concepts, objects and the several advantages are apparent from a study of this disclosure, the drawing, and the appended claims.

According to the present invention oxygen is removed from a butadiene-containing stream as resulting from oxidative-dehydrogenation of hydrocarbons, e.g., butene, by water scrubbing said stream.

It now appears that the difference, if any, in result which is obtained in the butadiene scrubbing, when pure water or boiler blowdown is used, is negligible. In any event, for purposes of the concept of the present invention, these materials can be treated as functionally equivalent.

It is, however, noteworthy that boiler blowdown which can be found described in Woerner, Pat. 3,336,414, as having a pH of at least 10 can be beneficial because it is of value to scrub acidic materials out of the reactor effluent. These are not usually present in the butadiene product after oil absorption. Generally, intermediate concentrations between boiler blowdown and pure water will be suitable in practicing the invention. Boiler blowdown also has the advantage of availability in most plants in quantity and helps cost reduction. Thus, it is particularly of value in the consecutive washing of butadiene and reactor effluent.

As will be noted there results an improved efficiency in the scrubbing of the butadiene product when the reactor effluent has been scrubbed.

The data presented in Table I indicate that removal of oxygen with water is feasible even with just one stage of contacting. With several stages of contacting as in a commercial unit, efficiency will be significantly improved as illustrated in Table II, where the packed column provides about three or four stages of contacting.

Referring now to the drawing, an embodiment is shown diagramatically according to the invention in which steam and air are fed by 1 and 2, respectively, into oxy-dehydrogenation reactor 3 in which a hydrocarbon stream 4 containing butenes is oxidatively dehydrogenated. The conditions for the oxidative-dehydrogenation can be supplied by one skilled in the art. The reaction taking place in reactor 3 does not form a part of the invention. Ordinarily the temperature in reactor 3 will be at a temperature in the range of from about 900° F. to about 1150° F. The pressure will be ordinarily in the range of about 20 p.s.i.g. to about 40 p.s.i.g. Effluent from reactor 3 passes by 5 to effluent scrubber 6. This effluent contains all of the products formed in reactor 3 from which water has been removed at 22. In scrubber 6, the effluent is scrubbed with water supplied by 7. As later noted, the water in 7 can be, and now preferably will be, water used in washing oxygen from the butadiene product. Scrubbed effluent, separated from water which goes to drain 24 is passed by 8 to oil absorber 9 in which light ends are separated by 23 and the remainder of the stream 8 absorbed in a lean oil from 10. Rich oil 11 is passed to stripper column 12 wherein it is stripped with steam supplied by 13 regenerating lean oil 10. Condensate is removed at 14 and stripped hydrocarbon products, including butadiene, are passed by 15 to hydrocarbon product accumulator 16. Hydrocarbon product is passed by 17 to oxygen removal wash or scrub column 18 wherein it is scrubbed with fresh water supplied by 19. The water used in 18 can be passed to drain but preferably is passed by 7 and used as earlier noted. Some or all of the water entering from 19 can be replaced or substituted by boiler blowdown supplied by 20. Washed butadiene containing hydrocarbon product also containing butene is removed from the operation at 21 for further purification.

In the embodiment described, in one operation thereof, a hydrocarbon stream having the following composition:

| | Mol percent |
|---|---|
| Propylene | 0.93 |
| Isobutane | 0.58 |
| n-Butane | 5.97 |
| Neopentane | 0.70 |
| Isobutene | 0.40 |
| Butene-1 | 30.57 |
| t-Butene-2 | 33.36 |
| c-Butene-2 | 26.33 |
| Butadiene | 0.78 |
| Other | .3 |
| Total | 99.9 | is supplied at a rate of 600 lb./hr., together with 5218 pounds per hour of steam and 14,197 s.c.f.h. air to reactor 3.

The feed to the effluent scrubber has the following composition:

| | Mol percent |
|---|---|
| Isobutene | 0.02 |
| Oxygen | 5.71 |
| Nitrogen | 67.18 |
| Carbon monoxide | 1.17 |
| Carbon dioxide | 1.60 |
| n-Butane | 1.52 |
| Neopentane | 0.18 |
| Butene-1 | 1.00 |
| t-Butene-2 | 3.33 |
| c-Butene-2 | 2.11 |
| Butadiene | 15.51 |
| Other impurities | .4 |
| Total | 99.7 |

It will be evident to one skilled in the art in possession of this disclosure that a basic concept of the invention is practiced whenever the water wash is applied either to the reactor effluent or to the butadiene product or even, perhaps, at some intermeditae stage. Thus, a concept basic to the invention is that water has been discovered to act even better than tried and true agents which have been used heretofore to eliminate "popcorn" polymer formation or difficulties down the line when the butadiene is used as in the production of rubber or other products.

It is also within the scope of the present invention, if water wash is used at one place or the other in the operation, to combine this with the use of other agents at the same or said other place to obtain a combined effect. This would depend upon consideration of availability of agents, their solutions and water and consideration of costs and ultimate results desired.

Of course, as one of the earlier solutions proposed, there is the aqueous contacting composition of Pat. 3,336,414 to Woerner, above mentioned. Then, there are the sodium nitrite and the sodium sulfite solutions.

Importantly, and as a feature of the invention, it is carefully to be noted that the art has not appreciated that it would be possible to obtain the result of reducing a very small amount of oxygen in, specifically, the butadiene product stream by simply using ordinary water. Thus, when viewing the contacting zone C in the Woerner patent, one skilled in the art studying this disclosure will recognize that only boiler blowdown is taught and it is taught for use only for treatment of the reactor effluent and not for any other treatment as for contacting the ultimate butadiene product stream.

Thus, although water washing of hydrocarbon streams as in Pat. 3,281,489, issued Oct. 25, 1966 to G. D. Goering, has been disclosed there has been no teaching to the art for removal of oxygen thereby and therefore no appreciation in the art of the invention which is here claimed. Indeed the art continued to use the chemical agents which are known therein.

Reasonable variation and modification are possible within the scope of the foregoing disclosure, the drawing, and the appended claims to the invention the essence of which is that we have discovered that ordinary water can be used to considerably reduce the residual traces of oxygen, present in terms of parts per million, in an oxidative dehydrogenated product such as an unsaturated hydrocarbon, e.g., butadiene obtained from such treatment of hydrocarbons and that there have been provided a combination of steps in which the efficiency can be even further increased by first water washing the butadiene product and then using the wash water to scrub the oxidative dehydrogenation reaction zone effluent.

We claim:
1. The reduction of residual oxygen of the order of up to about 100 parts per million present in an alkadiene product containing from 4 to 20 carbon atoms obtained from oxidative dehydrogenation of an olefin, which comprises scrubbing said product with an agent consisting essentially of ordinary water.
2. A process according to claim 1 wherein after scrubbing the alkadiene product with water the thus used water is used to scrub the oxidative-dehydrogenation reaction zone effluent stream from which the alkadiene product is ultimately obtained.
3. The reduction of residual oxygen of the order of up to about 100 or so parts per million present in a butadiene product obtained from oxidative-dehydrogenation of butene which comprises scrubbing said product with an agent consisting essentially of ordinary water.
4. The process of claim 1 in which the alkadiene is isoprene, and the olefin is isoamylene.
5. The reduction of residual oxygen in a styrene product obtained from oxidative dehydrogenation of ethylbenzene, which comprises scrubbing said product with an agent consisting essentially of ordinary water.
6. A process according to claim 1 wherein the water is boiler blowdown or steam condensate.
7. A process according to claim 3 wherein the water is boiler blowdown or steam condensate.
8. A process according to claim 4 wherein the water is boiler blowdown or steam condensate.
9. A process according to claim 5 wherein the water is boiler blowdown or steam condensate.

References Cited

UNITED STATES PATENTS

| | | | |
|---|---|---|---|
| 3,336,414 | 8/1967 | Woerner | 260—681.5 |
| 3,308,210 | 3/1967 | Bowers et al. | 260—681.5 |
| 3,281,489 | 10/1966 | Goering | 260—681.5 |
| 2,824,148 | 2/1958 | Keuleman's et al. | 260—683 |
| 2,790,838 | 4/1957 | Schrader | 260—679 |
| 2,394,849 | 2/1946 | Doumani et al. | 208—48 X |

DELBERT E. GANTZ, Primary Examiner

G. E. SCHMITKONS, Assistant Examiner

U.S. Cl. X.R.

55—68; 260—669, 677, 683.3